UNITED STATES PATENT OFFICE.

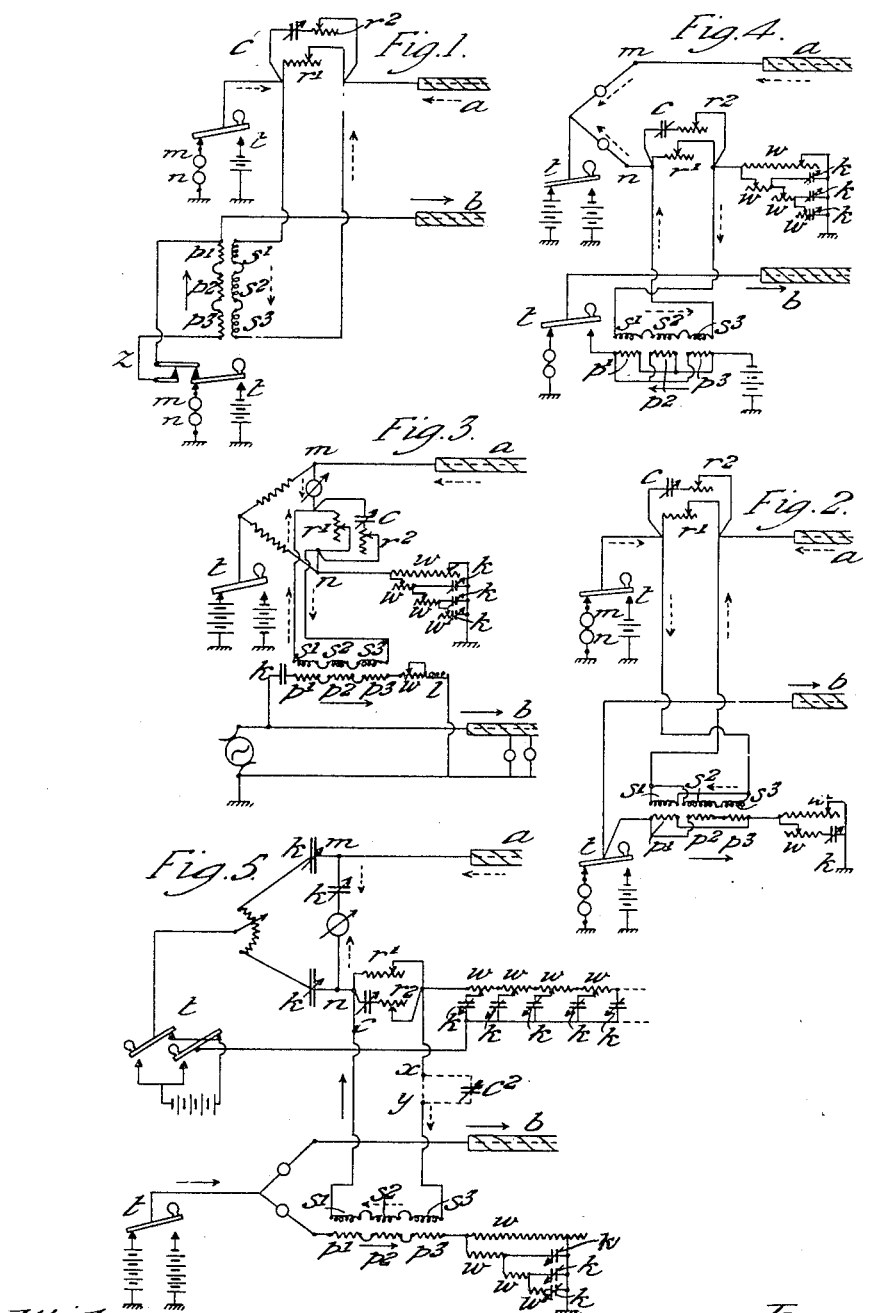

OSKAR MOLL AND PAUL KUSCHEWITZ, OF COUNTY OF KENT, ENGLAND.

DEVICE FOR PROTECTING TELEGRAPH AND LIKE LINES AGAINST INDUCTIVE ACTION FROM NEIGHBORING CIRCUITS.

1,120,517.  Specification of Letters Patent.  Patented Dec. 8, 1914.

Application filed May 22, 1913. Serial No. 769,298.

*To all whom it may concern:*

Be it known that we, OSKAR MOLL, a subject of the King of England, and PAUL KUSCHEWITZ, a subject of the King of Prussia, both residing in Kent, England, and whose post-office address is 75 Charlton road, Blackheath, in the county of Kent, England, have jointly invented a certain new and useful Improved Device for Protecting Telegraph and like Lines Against Inductive Action from Neighboring Circuits, of which the following is a specification.

The present invention relates to devices for protecting a line or circuit containing sensitive electric instruments against disturbing effects due to neighboring circuits. To obtain a satisfactory compensation of such disturbing effects it is essential that not only should the currents induced in the line to be protected be neutralized by currents of the same frequency and strength, but that the phase and form of the compensating currents should be very approximately the same as those of the currents induced from the neighboring lines. It has been previously proposed to compensate these currents by means of induction coils or transformers of which the primary winding was inserted in the disturbing line and the secondary winding in the line to be protected and the inductance and resistance of the secondary circuit of the transformer has been varied in order to produce the necessary strength and phase of the correcting current. No attempt was made in these earlier methods to adjust the capacity of the secondary circuit and therefore it was not possible to make the form of the compensating current similar to the form of the disturbing current.

According to the present invention the neutralizing currents introduced into the circuit to be protected are by varying the resistance inductance and capacity of the secondary circuit of the transformers made not only of the same strength but of the same form as the induced disturbing current and of the correct phase to compensate their effects.

For the purpose of explanation we have described the invention with reference to a telegraph line as representing the circuit to be protected, and the disturbing circuit is shown as either another telegraph line or an alternating power or lighting circuit.

The primary windings of the transformer are placed in the main circuit of the disturbing line, or in a shunt circuit thereto, and the currents in these primary windings have the same frequency and practically the same form as the disturbing influences. The secondary windings are suitably placed in the circuit of the line to be protected and the induced currents in them are modified as required, so as to have practically the same form as the disturbing currents and a strength sufficient to exactly compensate them. This is effected by employing any or all of the following methods, viz: varying the ratio of transformation between the primary and secondary, varying the magnetic reluctance of the core, varying the resistance connected in parallel with the secondary, varying the capacity and inductance connected in parallel or in series with the coil. By these means the protected line can be entirely freed from any disturbing effects from any other installation, which also has the very important advantage from the point of view of practical working, that more sensitive instruments may be employed and a more rapid rate of working is obtained. This obviously leads to very increased efficiency in all telegraphic systems, but is especially important for submarine and underground cables, telephone lines, and other circuits where sensitive instruments are employed.

In carrying out the principle of the invention certain circuit arrangements and disposition of the parts have been found specially advantageous and are shown in the accompanying drawings in which—

Figures 1 and 2 show the protecting arrangement applied to a simplex telegraph system, and Figs. 3, 4, and 5, to a duplex telegraph system.

The same references denote similar parts in all the figures.

In all cases $a$ is the protected line and $b$ the disturbing installation. The primary windings $p_1$ $p_2$ $p_3$ of the transformer are connected either in series or in parallel and of these windings a larger or smaller number may be taken as required. The windings may be placed directly in the circuit of the disturbing line (Fig. 1) or in the battery lead of this line (Fig. 4) or in a shunt to the disturbing line (Figs. 2 and 5) which contains variable resistances $w$ and adjustable capacities $k$ or again in series with an adjustable condenser in a shunt circuit, containing an adjustable resistance $w$ and a variable self-inductance $l$ (Fig. 3).

In the circuit arrangement shown in Fig. 1, a device $z$ short circuits the primary windings, $p_1$, $p_2$, $p_3$ of the transformer, in the raised position of the key $t$, in which the receiving instrument $m\,n$ is operated by currents received over the line $b$. The short circuit is removed, when the key $t$ is depressed for the purpose of transmitting signals over the line $b$.

The secondary windings $s_1$ $s_2$ $s_3$, which also can be connected as required, either singly, or in series, or parallel, are placed (Figs. 1 and 2) in a simplex system, directly in the circuit of the line to be protected. If the line is worked on the duplex system, the secondary windings may be placed in the "artificial line" of this system (Figs. 4 and 5). In the case of a duplex system worked on the "bridge" principle, the secondary coils may be placed in the bridge circuit, in the same branch as the receiving instrument (Fig. 3). The protecting currents which traverse the receiving instrument are made to have the same form and intensity and to be opposite in direction to the disturbing currents. This is effected by varying the resistance $r_1$ which is connected in parallel with the secondary coils, and which is preferably inductive, and also by varying the capacity $c$ which in series with the resistance $r_2$ is also in parallel with the secondary coils. For this purpose also a condenser $c_2$ may be interposed in series as shown in Fig. 5 between the points $x$ and $y$ of the secondary circuit.

The action is as follows:—If the current arising in the disturbing installation has the direction indicated by the plain arrow in the respective drawings, and it sets up in the telegraph line situated within the range of disturbing influence of these installations, a disturbing current of which the direction may be as indicated in the drawings by dotted arrows; then, in the absence of a protecting arrangement, these disturbing currents would interfere with the action of the receiving instruments. If the present invention is applied, at the moment when a current passes through the disturbing installation, either the same current (Figs. 1 and 4) or a shunt current of approximately the same form (Figs. 2, 3, 5) will pass through the primary windings of the transformer, generating in the secondary windings an induced current, which is arranged to have the same direction at any given time as the induced current in the disturbed line. If, now, the secondary windings, as indicated in the drawings, are connected so that this induced protective current passes through the receiving instrument in a direction opposite to that of the disturbing current, and if a correct balancing is effected by means of the variable factors $w\,k\,l\,c\,r$ and $r_2$ and of the magnetic reluctance of the transformer, which is regulated by varying the coupling of the primary and secondary of the transformer, or by a displaceable iron core, the disturbing current will be completely neutralized by the protective current, or, in other words, the difference of potentials arising from the disturbance at the terminals $m\,n$ of the receiving instrument, will be eliminated.

Having thus described our invention and the best means we know of carrying same into effect, we claim:—

1. Means for protecting a line containing sensitive electric instruments against disturbing effects produced by the currents in a neighboring circuit, the said means comprising a transformer, of which the primary coils are connected to the disturbing system and the secondary coils are connected to the line to be protected and in which the resistance, inductance and capacity of the primary and secondary circuits can be adjusted, so that the disturbing currents in the line to be protected are annulled by compensating currents of the same frequency, intensity and form and of opposite phase.

2. Means for protecting a line containing sensitive electric instruments against disturbing effects produced by the currents in a neighboring circuit, the said means comprising a transformer of which the primary coils are connected to the disturbing system and the secondary coils are connected to the line to be protected and in which the secondary coils are shunted by a variable capacity and a variable resistance.

3. Means for protecting a line containing sensitive electric instruments against disturbing effects produced by the currents in a neighboring circuit, the said means comprising a transformer, of which the primary coils are connected to the disturbing system and the secondary coils are connected to the line to be protected and in which the resistance, inductance and capacity of the primary and secondary circuits can be adjusted, so that the disturbing currents in the line to be protected are annulled by compensating currents of the same frequency, intensity and form and of opposite phase, and means for varying the magnetic reluctance of the said secondary circuit.

4. Means for protecting a line containing sensitive electric instruments against disturbing effects produced by the currents in a neighboring circuit, the said means comprising a transformer, of which the primary coils are connected to the disturbing system and the secondary coils are inserted in the "artificial line" of a duplex telegraph system and in which the resistance, inductance and capacity of the primary and secondary circuits can be adjusted, so that the disturbing currents in the receiving instrument of the duplex line are annulled by compensating currents of the same frequency, intensity and form and of opposite phase.

In testimony whereof we have signed our names to this specification in the presence of two subscribing witnesses.

OSKAR MOLL.
PAUL KUSCHEWITZ.

Witnesses:
LOUIS VANDORY.
MAX KNORR.